Nov. 13, 1951      M. I. TAYLOR      2,574,768
TEMPERATURE RESPONSIVE VENTILATOR FOR BEEHIVES
Filed June 26, 1947
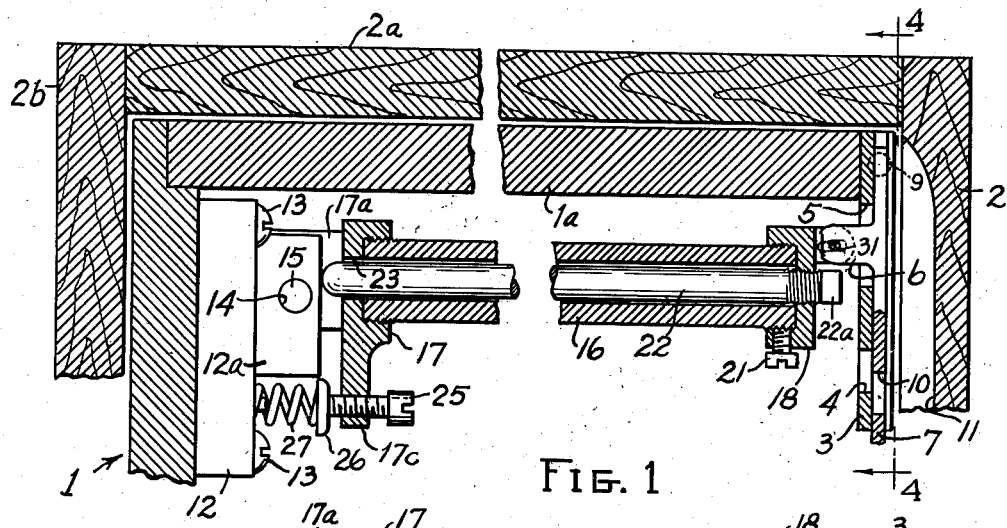
Fig. 1
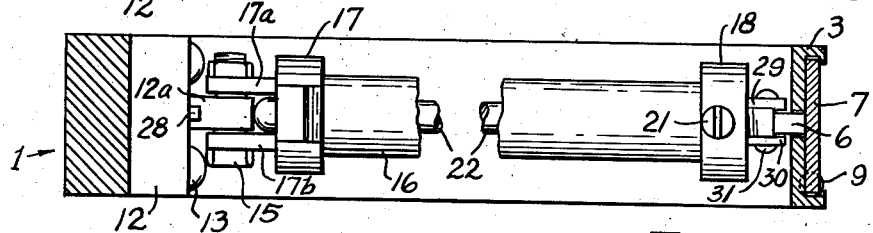
Fig. 2
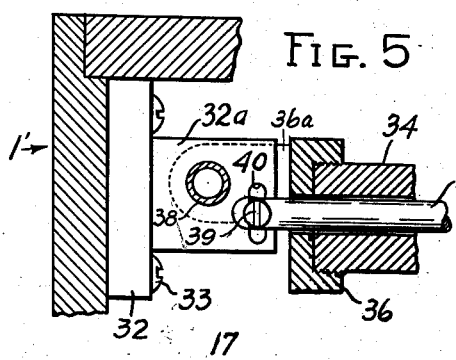
Fig. 5
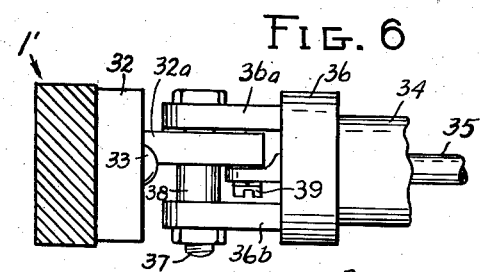
Fig. 6
Fig. 4
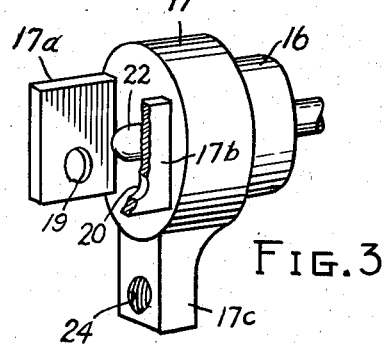
Fig. 3
Inventor
MERRITT I. TAYLOR
By Elizabeth Newton Dew
Attorney Patented Nov. 13, 1951

2,574,768

UNITED STATES PATENT OFFICE 2,574,768

TEMPERATURE RESPONSIVE VENTILATOR FOR BEEHIVES

Merritt I. Taylor, Richmond, Va.

Application June 26, 1947, Serial No. 757,258

11 Claims. (Cl. 236—49)

This invention relates to temperature responsive ventilators for beehives and, more particularly, to such a ventilator wherein the temperature responsive element comprises two elongated metallic elements of different coefficients of thermal expansion.

One of the problems confronting bee keepers is control of temperature within the hive. During the winter a certain amount of upward ventilation is desirable at all times to allow the moisture laden air to pass out of the hive. However, after brood rearing has begun it is desirable that this upward ventilation be maintained at a desired minimum when the outside temperature drops below 70° F. It is also highly desirable that the ventilation be automatically increased when the temperature rises above a certain value in warm weather and decreased except for the aforesaid certain amount of upward ventilation in cold weather. These changes in ventilation of a hive may be required daily as well as with the seasons as in climates where extremes of heat and cold are common over twenty-four hour periods such that the hive may become excessively hot during the day while the temperature will become too low at night unless the ventilation is controlled. The ventilation apertures may also have the additional advantage of providing a top entrance for the bees.

It is the general purpose of my invention to meet the problem mentioned in the foregoing paragraph by providing an attachment for a hive which is fully automatic to ambient changes of temperature to afford complete and adequate ventilation of the hive at those times when the temperature in the hive is at or above a predetermined value, and to automatically close the ventilation apertures whenever the temperature drops to or below a healthful value for the colony.

More specifically, it is an object of the invention to provide a temperature responsive ventilator slide actuating means which is powerful and positive in operation and yet capable of sensitive and accurate control and adjustment to suit various climates, locations and other variable conditions of use.

A further object is to provide a temperature responsive ventilator wherein the thermo-sensitive part comprises two metallic elements having a relatively large difference between their coefficients of thermal expansion and wherein the elements themselves constitute the multiplying lever for multiplying the changes in lengths of the elements to the desired linear value.

A still further object is to provide a thermo-responsive actuating element having positive drive for both increase and decrease of temperature and which is compact, relatively simple and reliable in operation over an indefinite period of time.

Other objects and advantages will become apparent after a study of the following disclosure.

In the drawing:

Figure 1 is a plan view, partly in section, of one form of the invention mounted in position in a hive and utilizing a spring drive in one direction of movement of the ventilator slide.

Figure 2 is an elevation of the species of Figure 1, the ventilator frame and slide being shown in section.

Figure 3 is a perspective view showing in greater detail the pivoted end of the bi-metallic actuating elements and the mounting cap therefor.

Figure 4 is a view taken upon a plane indicated by line 4—4, Figure 1, and showing the anti-friction mounting of the ventilator slide.

Figure 5 is a plan view partly in section and corresponding to Figure 1, but showing a modification utilizing positive thermo-responsive driving power for both directions of operation of the slide.

Figure 6 is an elevational view of the species of Figure 5.

Referring in detail to the drawing, 1 identifies generally a frame adapted to rest upon and be supported by the top edges of the walls of a standard rectangular beehive and which may replace the standard inner cover used with such hives or which may be interposed between such cover and the hive. In this frame, the part 1a may be either an end or side piece as desired. The side walls of the top or outer cover are identified at 2, 2a and 2b. This outer cover fits down over and about the hive walls with a substantial overlap so that the ventilator frame of my invention as well as the inner cover, may be completely enclosed when the outer cover is in place.

At least one side, or end, of frame 1, is formed by a channel guide 3 secured at its ends in any suitable manner, to the ends of sides such as 1a. This guide 3 has spaced ventilator apertures throughout its length, as shown at 4, and a narrow slot 5 at one end through which extends a lug 6 secured to or formed integrally with a ventilator slide 7 mounted for free sliding within channel guide 3. As shown at Figure 4, the slide is cut away at its ends, as indicated at 8. A bearing ball 9 rests in the lower channel portion and, in turn, supports slide 7 so that a small force is sufficient to move the slide. It will be understood that the other end of slide 7 is supported by a second ball, in the same manner as has just been described. If desired or found necessary, one or more additional bearing balls may be used midway of the length of the channel to afford additional support for the slide.

The slide has ventilator openings as at 10, spaced equally with apertures 4 so that, in one limiting position of slide 7, all apertures are completely out of alignment and ventilation to the inside of the hive is cut off, while in the other limiting position, each aperture 10 is in full alignment with its corresponding aperture 4, and full ventilation is afforded. The frame 1 may be made of wood, metal, or plastic and, if of plastic or metal, may be formed in one piece. As indicated at 11, Figure 1, wall 2 may be cut away on its inner surface to facilitate the passage of air to and from the ventilator frame. This cut away portion, of course, opens downwardly only so that no moisture can enter therethrough.

A base 12 is attached by screws 13 to the inner wall of one side of frame 1. This base has an upstanding lug 12a, apertured at 14 to accommodate with a snug fit, a pivot bolt 15. A length of tube 16, which may conveniently be of aluminum, is threaded at both ends. As seen in Figures 1 and 2, the left end of this tube has a first cap 17 threaded thereon. This cap has spaced lugs 17a and 17b outstanding from the face thereof and having aligned apertures as at 19 and 20, Figure 3, to receive pivot bolt 15. The lugs 17a and 17b are spaced to accommodate lug 12a between them with a smooth fit so that, when the parts are assembled as shown, the tube 16 may pivot smoothly and without play, on bolt 15.

The other end of tube 16 has a second cap 18 threaded thereon and held in adjusted position by a set screw 21. The end cap 18 has a central hole in which is threaded or otherwise secured one end of a rod 22 which may be formed of an alloy having substantially zero coefficient of linear thermal expansion over ordinary temperature range such as the well-known nickel-iron base alloys known as "Invar" or "Elinvar." This rod has a squared end 22a extending from cap 18. The rod extends with a loose fit through tube 16 and its other end projects a short distance through a central aperture 23 in cap 17 and terminates in a rounded end which, in the assembled position, bears on the smooth flat outer end of lug 12a.

From Figure 1 it will be noted that the axis of bolt 15 is offset from the point of contact of rod 22 with lug 12a in a direction transversely of the rod. The linear value of this offset will be determined by several factors such as the length of the tube and rod, the available temperature range and the linear value of the desired control movement. An offset of approximately one-eighth inch is satisfactory for the indicated conditions of use and is shown somewhat exaggerated in the figures for clarity of illustration.

Cap 17 has an arm 17c extending downwardly therefrom as seen in Figure 1 and has a tapped hole 24 in which a screw 25 is threaded. The end of this screw carries a dished washer 26. A coil spring 27 is interposed between washer 26 and base 12, and acts to urge tube 16 counterclockwise as seen in Figure 1. This movement is limited by the engagement of the end of rod 22 against lug 12a. The spring 27 is omitted in Figure 2 for clarity of illustration. Its end adjacent base 12 is held in position by a pin 28.

Cap 18 has a pair of parallel arms 29 and 30 extending therefrom and spaced to receive lug 6 therebetween. The arms are slotted as indicated in dotted lines, Figure 1, and a pivot pin 31 passes through the slots and a hole in lug 6. Thus, as the length of tube 16 increases with rise in temperature, the end of rod 22 tends to move away from lug 12a and, because of the action of spring 27, the right end of the tube moves upwardly as seen in Figure 1, to bring the apertures 4 and 10 more nearly into full alignment. By turning the end 22a of rod 22, after installation, the instrument may be adjusted to bring slide 7 into any desired position relatively to guide 3 for the temperature at the time of adjustment. Furthermore, by properly correlating the width of apertures 4 and 10 with the length of the tube 16 and the effective temperature range, the ventilator may be designed to make certain that the ventilator apertures are fully closed at a predetermined low temperature and fully open at a predetermined high temperature. Thus, supposing that the tube 16 is one foot in length, that the offset of rod 22 relatively to bolt 15, is one-eighth inch and that the apertures should be fully closed at 57° F. and fully open at 90° F. The temperature range is then 33° F., the change in length of tube 16 over this range is about one two-hundredths of an inch and the corresponding translation of slide 7 will be very closely ½ inch. Thus by making the ventilator apertures about ½ inch in width and by proper adjustment of rod 22, the apertures will be fully closed at 57° F. and fully open at 90° F.

In Figures 5 and 6 I have shown a modification in which spring 27 may be omitted if desired and positive operation attained by the thermo-responsive elements for increasing as well as decreasing temperatures. In these figures, 1' indicates a ventilator frame which may be a duplicate of the one described in connection with Figures 1 and 2. A base 32 has a pivot lug 32a and is secured to the frame 1' by screws 33. The tube 34 and rod 35 may be duplicates of 16 and 22, respectively. Tube 34 has a cap 36 threaded thereon. This cap has spaced parallel lugs 36a and 36b. A pivot bolt 37 passes through aligned apertures in lugs 32a, 36a and 36b, to afford a smooth pivot joint without play. A spacer sleeve 38 is interposed between lugs 32a and 36b, as shown at Figure 6.

Rod 35 may be flattened at its end projecting from cap 36. A pivot pin 39 is threaded into an aperture in the end of rod 35 and has a smooth reduced end fitting a slot 40, Figure 5, in lug 32a. This slot is generally normal to the axis of rod 35 so that as tube 34 increases and decreases in length with change of temperature a torque is applied to tube 34 positively moving its opposite end in a corresponding direction as will be obvious from inspection of the figures.

It will be understood that the other end of tube 34 and rod 35 may be connected together and to slide 7 in the same manner as shown in Figures 1 and 2. Of course, a take-up spring corresponding to 27 may be used with the species of Figures 5 and 6 if desired. Also it is contemplated that spring 27 may be replaced by a coil or leaf spring acting directly on slide 7. For example, such a spring might be attached between end or side 1a, Figure 1, and lug 6, to urge slide 7 upwardly as viewed in that figure.

I have thus provided a temperature-responsive ventilator for beehives which is powerful in operation, very sensitive to temperature changes and easily designed and adjusted for the desired limiting temperatures. The ventilator is relatively simple and inexpensive to construct and may be quickly applied without any substantial changes or alterations to the hive to which it is to be applied.

While I have shown a preferred form together with a modification thereof, numerous other changes, substitutions and modifications will occur to those skilled in the art after a study of the present disclosure. For example, the tube 16 and rod 22 may be replaced by rigid lengths of the corresponding metals rectangular in cross section and rigidly connected at one end. The pivot bolt 15 may be replaced by a leaf spring attached at one end to one of the lengths of metal and at the other end to base 12. The adjacent end of the other length may then engage an abutment on base 12. While I have shown in Figures 1 and 2, an arrangement whereby the slide is operated for decreasing temperatures by tube 16 and rod 22, it will be obvious that by making tube 16 of an alloy having substantially zero coefficient of linear thermal expansion and rod 22 of aluminium or other high-coefficient metal, the action may be reversed.

In the claims, the term "strip" is to be interpreted to include an elongated, substantially straight length of metal irrespective of its cross-sectional shape.

In the claims, the term "relatively high coefficient of expansion" is to be understood as a coefficient of linear thermal expansion of $9 \times 10^{-6}$ (and above) per degree Fahrenheit at about 70° F.

For the foregoing reasons, the disclosure is to be taken in an illustrative rather than a limiting sense; and it is my desire and intention to reserve all such modifications as fall within the scope of the subjoined claims.

Having now fully disclosed my invention, what I claim and desire to secure by Letters Patent is:

1. The combination with a beehive having closed side walls, a frame adapted to rest upon and be supported by said walls and having the same shape as the beehive, there being a ventilator opening through one wall of said frame, closure means supported by said frame and movable thereon to open and close the ventilator opening, first and second elongated strips, said first strips comprising a metal having a relatively high coefficient of expansion and said second strip comprising an alloy having a substantially zero coefficient of expansion, means rigidly uniting said strips at one end only in coextensive parallel relation, a base fixedly carried by said frame, means mounting the other end of one said strip for pivotal movement on said base about an axis normal to said strip, the adjacent end of the other said strip engaging said base at a point offset from said axis normal to said strips, means drivingly connecting said closure means to said strips adjacent their connected ends to open and close the same in response to predetermined temperature change within the beehive, and spring means between said base and said one strip, said spring means urging said strips toward pivotal movement in a direction holding said other strip in contact with said base.

2. A ventilator for a beehive, having closed side walls, in combination a frame adapted to rest upon said walls and including a side wall having ventilating apertures therein and a slide translatable to close and uncover said apertures, a tube, a base fixedly carried by said frame, means pivoting said tube at one end on said base on an axis transverse to said tube, a rod loosely fitting within said tube and secured thereto at the end remote from said base, said rod engaging said base at a point offset from said pivot axis, and means at said remote end connecting said tube to said slide, said rod and tube being of metals having a difference between their coefficients of linear thermal expansion.

3. A ventilator as recited in claim 2, the means securing said rod and tube together comprising a cap secured over the adjacent end of said tube and having a central threaded aperture, the adjacent end of said rod being threaded through said aperture and projecting a short distance from said cap, whereby said rod may be turned to adjust the position of said slide at any selected temperature.

4. In a generally rectangular ventilator frame for beehives and comprising four sides, one said side comprising a guide having a first set of ventilator apertures therethrough and a slide translatably carried by said guide and having a second set of ventilator apertures therethrough, said slide being movable between first and second positions to move each aperture in said slide from complete alignment to completely close said first set of apertures, a tube, first and second caps secured over each end of said tube, each cap having a central aperture, a rod passing through said tube and projecting through each said aperture, said rod threadedly engaging said first cap, means mounting said second cap on a side of said frame in position remote from said slide, for pivotal movement on an axis transverse to said tube, the adjacent projecting end of said rod engaging said means at a point offset from said axis in a direction transversely of said tube, and pivot means connecting said first cap with said slide, one of said tube and rod being of an alloy having substantially zero coefficient of expansion, and the other being of a metal having a large coefficient of expansion.

5. A ventilator for a beehive, a base, tube means pivoted at a first end on said base on an axis normal to said tube means, a rod passing through said tube means and secured thereto at a second end, the adjacent end of said rod engaging said base at a point offset from said axis transversely of said tube means and rod, and movable ventilator means connected with the tube means adjacent its end remote from said base for actuation thereby said tube means being composed of a substance of materially different coefficient of thermal expansion from that of said rod.

6. A ventilator for a beehive, having, in combination, a frame adapted to be supported by the side walls of said hive and including a slide translatable to open and close ventilator apertures in said frame, a base carried by and rigid with respect to said frame, a tube of metal having a relatively high coefficient of thermal expansion, means mounting said tube at one end on said base for pivotal movement thereon about an axis normal to the longitudinal axis of said tube, a rod of an alloy having substantially zero coefficient of linear thermal expansion extending within and along said tube, means fixing said tube and rod together at their ends remote from said base, said rod at its end adjacent said base engaging an abutment on said base at a point adaxial to the pivot axis of said tube, a spring acting between said tube and base and tending to pivot said tube on its axis to urge said rod into engagement with said abutment, and means connecting the end of said tube remote from said base, with said slide to actuate the same in response to variations in ambient temperature.

7. A ventilator for a beehive, having, in combination, a frame adapted to be supported by the side walls of said hive and including a part movable to open and close a ventilator opening in said frame, a tube, a base adapted to be rigidly carried by said frame, a cap having a central aperture secured to one end of said tube, lugs projecting from said base and cap and having aligned apertures through which a pivot bolt passes to pivot said tube on said base on an axis normal to the axis of said tube, a rod extending along and within said tube, means adjustably securing said tube and rod together at their ends remote from said base, said rod projecting through said aperture, pin and slot means in said base and projecting end of said rod connecting said rod and base at a point offset from said axis, and a driving connection between said part and the end of said tube and rod remote from said base said tube being composed of a substance having a coefficient of thermal expansion differing materially from that of said rod.

8. A ventilator and top entrance for a beehive comprising a rectangular frame of the same size as the hive and adapted to rest upon and be supported by the side walls of the hive, said frame having a plurality of combined ventilator and entrance openings in and through at least one side thereof, closure means carried by said frame and movable to close said openings, a base on the side of frame opposite the side having said closure means, a pair of elongated metallic elements of different coefficients of expansion and rigidly secured together at one end, means pivoting one said element on said base at its other end, an abutment on said base engaged by the adjacent end of the other said element at a point slightly offset from the pivot axis of said pivoting means in a direction normal to said elongated elements, an operating connection between the connected ends of said elements and said closure means, whereby said ventilator and entrance openings are opened and closed in response to changes in ambient temperature and resilient means urging said other element into engagement with said abutment.

9. In combination with a beehive having closed side walls and a cover adapted in normal position to fit down over and about the upper portion of said walls, a ventilator frame adapted to rest upon said walls and to be enclosed by said cover when the latter is in normal position, said frame having combined ventilating and entrance openings therethrough, a slide, means mounting said slide on said frame for movement from a first position closing said openings to a second position leaving said openings unobstructed, a base on said frame, a tube of metal having a high coefficient of linear expansion, means mounting said tube on said base for pivotal movement about an axis normal to said tube, a rod of an alloy having a substantially zero coefficient of linear expansion fitting said tube and engaging said base at one end of said rod in offset relation from the pivot axis of said tube, means uniting said tube and rod at their ends remote from said base, and an operating connection at said remote end, between said tube and slide.

10. The combination recited in claim 9, said means uniting said tube and rod comprising a cap threaded on the end of said tube and having a central threaded aperture, said rod threaded into said aperture, whereby turning adjustment of said rod enables calibration setting of said slide.

11. The combination with a beehive having side walls and a top adapted to fit over and about the top portions of said walls, a frame including a wall having ventilator apertures therein, slide means carried by said frame and movably relatively thereto to open and close said ventilator apertures, first and second rigid lengths of metal connected at their first ends, one said length of metal having a coefficient of thermal expansion materially different from that of the other, a base secured to said frame, means pivoting the second end of one said length of metal only on said base for movement about on axis normal to both said lengths, the adjacent end of the other said length of metal engaging said base at a point offset from said axis in a direction normal to said axis and said length of metal, means operatively connecting the first ends of said lengths to said slide means to move the same in response to temperature changes in the beehive, and spring means between said base and lengths of metal to urge the same into pivotal movement to hold the adjacent end of said other length of metal in contact with said base.

MERRITT I. TAYLOR.

REFERENCES CITED

The following references are of record in the file of this patent:

UNITED STATES PATENTS

| Number | Name | Date |
|---|---|---|
| 304,695 | Brinckerhoff | Sept. 9, 1884 |
| 373,324 | Wheeler | Nov. 15, 1887 |
| 395,382 | Crowell | Jan. 1, 1889 |
| 1,290,866 | Arias | Jan. 14, 1919 |
| 1,358,193 | Fulton | Nov. 9, 1920 |
| 1,780,758 | Leupold | Nov. 4, 1930 |
| 2,026,866 | Chadwick et al. | Jan. 7, 1936 |
| 2,434,090 | Alton | Jan. 6, 1948 |